G. E. Norris,
Saw Filer.

No. 103,075.  Patented May. 17, 1870.

Witnesses:
John Beeker
D. S. Mabee

Inventor:
G. E. Norris
Per Munn & Co.
Attorneys.

United States Patent Office.

GEORGE E. NORRIS, OF GLEN'S FALLS, NEW YORK.

Letters Patent No. 103,075, dated May 17, 1870.

IMPROVEMENT IN SAW-FILING INSTRUMENT.

The Schedule referred to in these Letters Patent and making part of the same.

*To all whom it may concern:*

Be it known that I, GEORGE E. NORRIS, of Glen's Falls, in the county of Warren and State of New York, have invented a new and useful Improvement in Saw-Filing Instrument; and I do hereby declare that the following is a full, clear, and exact description thereof, which will enable others skilled in the art to make and use the same, reference being had to the accompanying drawings forming a part of this specification, in which—

Similar letters of reference indicate corresponding parts.

My invention has for its object to furnish a simple and convenient instrument, by means of which a saw may be filed conveniently and accurately, at any desired pitch and bevel, and which will insure all the teeth being filed exactly alike; and It consists in the construction and combination of the various parts of the instrument, as hereinafter more fully described.

Figure 1:
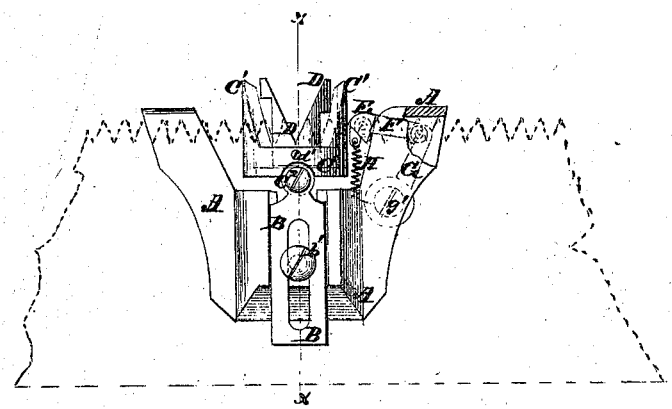
Figure 1 is a side view of my improved instrument.

A is the frame of the instrument, which is slotted vertically, from its lower side, to receive the saw, and rests upon the teeth of the saw, as shown in fig. 1.

In vertical grooves in the side of the frame A are placed arms or bars, B, which are adjustably secured to said frame by set-screws $b'$, which pass through slots in the said arms or bars, and screw into the said frame.

Figure 2:
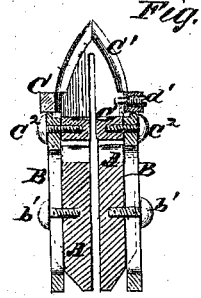
Figure 2 is a vertical section of the same, taken through the line $x\ x$, fig. 1.

C is the head, the base or lower part of which is made circular, and from the opposite sides of its upper edge rise two angular projections, $c^1$, as shown in figs. 1 and 2. The head C is slotted vertically from its lower side, to correspond with the slot of the frame A, said slot passing up through the angular projections $c^1$, nearly to their angles, as shown in fig. 2.

The lower part of the head, at right angles with the angular projections $c^1$, is recessed to receive the rounded upper ends of the arms or bars B, to which ends the said head C is secured by screws $c^2$.

By this construction the head C may be inclined, to give the required pitch to the saw-teeth, and, when adjustable, may be securely clamped to the side arms or bars B. The adjustment of the bars B enables the head C to be raised and lowered according as the saw to be filed may have more or less teeth to an inch.

Figure 3:
Figure 3 is a side view of the gauge.

D is the gauge, which is made cylindrical in its general form, and the upper part of which is notched, as shown in fig. 1, said notch being made of exactly the same angle as the file to be used. The gauge D is slotted to receive the saw, said slot being so formed, as shown in figs. 1 and 3, that the gauge D may be partially rotated in its seat in the head C, to give the desired bevel to the saw-teeth.

The gauge D is secured in place, when adjusted, by the set-screw $d'$, which passes in through the side of the head C, and enters a groove in the side of the said gauge D.

E is an angular gauge, pivoted at its end to the free end of the arm F, the other end of which is pivoted to the upper end of the arm G, the lower end of which is adjustably secured to the frame A by a screw, $g'$. The gauge E is designed to enter the notches between the saw-teeth, and insure the teeth being in proper position in the gauge D to be operated upon.

The gauge E is held down upon the saw-teeth by the coiled spring H, the upper end of which is attached to the free end of the arm F, and its lower end is attached to the lower end of the arm G, as shown in fig. 1.

In using the instrument the file should every time be used till it goes down to the bottom of the notch in the gauge D, which gauge should be case-hardened, so that the file will not act upon it.

Having thus described my invention,

What I claim as new, and desire to secure by Letters Patent, is—

1. The frame A, slotted arms B, adjustable head C $c^1$, and adjustable case-hardened gauge D, in combination with each other, said parts being constructed and operating substantially as herein shown and described, and for the purposes set forth.

2. The combination of the frame A, adjustable arms B, adjustable head C $c^1$, adjustable case-hardened gauge D, gauge E, pivoted arm F, adjustable arm G, and spring H with each other, said parts being constructed and operating substantially as herein shown and described, and for the purposes set forth.

GEORGE E. NORRIS.

Witnesses:
WILLIAM HOTCHKISS,
S. L. GOODMAN.